US009472195B2

(12) United States Patent
Papierman et al.

(10) Patent No.: US 9,472,195 B2
(45) Date of Patent: Oct. 18, 2016

(54) SYSTEMS AND METHODS FOR DETECTING FRAUD IN SPOKEN TESTS USING VOICE BIOMETRICS

(71) Applicant: Educational Testing Service, Princeton, NJ (US)

(72) Inventors: Paul Papierman, Bridgewater, NJ (US); Srinivas Patibanda, Belle Mead, NJ (US); Venu Valamparampil Rajappan, Kendall Park, NJ (US); Mary Ellen Ferrara, Millstone Township, NJ (US); Frederick A. Cline, Lawrenceville, NJ (US); Michael T. Wilcox, Morgantown, PA (US)

(73) Assignee: Educational Testing Service, Princeton, NJ (US)

( * ) Notice: Subject to any disclaimer, the term of this patent is extended or adjusted under 35 U.S.C. 154(b) by 36 days.

(21) Appl. No.: 14/670,034

(22) Filed: Mar. 26, 2015

(65) Prior Publication Data
US 2015/0279372 A1 Oct. 1, 2015

Related U.S. Application Data

(60) Provisional application No. 61/970,420, filed on Mar. 26, 2014, provisional application No. 62/006,319, filed on Jun. 2, 2014.

(51) Int. Cl.
*G10L 25/00* (2013.01)
*G10L 17/22* (2013.01)
*G09B 7/00* (2006.01)

(52) U.S. Cl.
CPC *G10L 17/22* (2013.01); *G09B 7/00* (2013.01)

(58) Field of Classification Search
USPC .......... 704/246, 247, 251, 252, 273
See application file for complete search history.

(56) References Cited

U.S. PATENT DOCUMENTS

| | | | | |
|---|---|---|---|---|
| 2003/0115475 A1* | 6/2003 | Russo | ............... | G06K 9/00026 713/186 |
| 2007/0219801 A1* | 9/2007 | Sundaram | ............... | G10L 17/04 704/270 |
| 2008/0270132 A1* | 10/2008 | Navratil | ............... | G10L 17/06 704/250 |

* cited by examiner

*Primary Examiner* — Leonard Saint Cyr
(74) *Attorney, Agent, or Firm* — Jones Day

(57) ABSTRACT

Systems and methods described herein automate imposture detection in, e.g., test settings based on voice samples. Based on user instructions, a processing system may determine at least one set of appointments, each having voice samples and a voice print, and a comparison plan for comparing the appointments. The comparison plan defines a plurality of appointment pairs. For each appointment pair, the system compares the associated first and second appointments by, e.g., comparing the first appointment's voice samples to the second appointment's voice print and generating corresponding raw scores, which may be used to compute a composite score. If the composite score satisfies a predetermined threshold condition for fraud, the system may determine whether flagging/holding criteria are satisfied by the raw scores. If the criteria are satisfied, a flag or hold notice may be associated with the appointment pair to trigger an appropriate system/human response (e.g., withholding the appointments' test results).

23 Claims, 10 Drawing Sheets

SYSTEMS AND METHODS FOR DETECTING FRAUD IN SPOKEN TESTS USING VOICE BIOMETRICS

CROSS-REFERENCE TO RELATED APPLICATIONS

The present application claims the benefit of U.S. Provisional Application Ser. No. 61/970,420, entitled "Voice Biometric Analysis," filed Mar. 26, 2014, the entirety of which is hereby incorporated by reference. The present application further claims the benefit of U.S. Provisional Application Ser. No. 62/006,319, entitled, "Systems and Methods for Voice Biometric Analysis," filed Jun. 2, 2014, the entirety of which is hereby incorporated by reference.

FIELD

This disclosure is related generally to automated fraud detection and more particularly to detection of imposters in spoken response test scenarios.

BACKGROUND

Integrity of testing results is important to any test, including those requiring spoken responses. Integrity, however, may be compromised in a spoken test by an imposter taking the test in lieu of the expected registered test taker. Such fraudulent activities pose a threat not only to the validity of individual test scores but also the perception among score users (e.g., universities and employers) of the test's overall integrity and reliability, especially if the fraudulent activities are not identified until after the scores have been reported to the score users. Fraudulent activities in testing situations would also impact other candidates who did not commit fraud, as the fraudulently obtained high scores may lessen the perceived significance of the scores of those who did not commit fraud.

The present inventors have recognized and appreciated a need for improved approaches to detect potential fraud in test taking activities.

SUMMARY

The systems and methods described herein provide robust means to systematically and automatically detect fraud in, e.g., verbal test settings by employing voice biometric technology. Biometric technology implemented as described herein may permit the use of human voice to authenticate an individual's identity for a test taking activity. Voice print technology may use a system that extracts an individual's speech features to generate a unique voice print, which then can be used to verify whether the a claimed speaker is the true speaker by matching the voice print to the claimed speaker's voice samples for substantiating the integrity of test taking activities. The systems and methods are designed to handle large amounts of data and comparisons given the nature of typical test settings (e.g., standardized tests such as the TOEFL and TOEIC). While the description provided herein is primarily directed towards applying the underlying technology in a verbal test setting, the technology may be also be used in any other setting where a speaker's identity is important but may be suspect, such as employment or college admission interviews.

The systems and methods described herein receive audio/video data and user (e.g., test administrator) input to determine a comparison plan, analyze audio/video data according to the plan, extract various features from the audio/video data, compare the features to voice prints, and transform the comparison results into alerts or automated responses to potential fraudulent activities. Performing fraud detection based on voice comparisons typically is not humanly feasible, given that voice identification cannot be reliably performed by humans. Moreover, the large amount of data requiring processing would be prohibitively costly and time consuming to be performed by humans (such as in standardized test settings involving thousands of test takers). In fact, even with state-of-the-art super computers, processing time and resources could be very significant, which is why the systems and methods described herein include ways to decrease processing time.

Described herein are exemplary embodiments of computer-implemented methods and systems for detecting imposture in a collection of appointments based on voice samples. A processing system may receive instructional information specifying one or more parameters. Based on the information, the system may determine at least one set of appointments, each appointment being associated with one or more voice samples and a voice print. The system may determine a comparison plan based on the instructional information. The comparison plan defines a plurality of appointment pairs, each appointment pair including a first appointment selected from the at least one set of appointments and a second appointment selected from the at least one set of appointments. In some embodiments, the first appointment and the second appointment are different. For each of the plurality of appointment pairs, the system compares the first appointment and the second appointment to identify imposture, as follows. The system compares each of a predetermined number of the voice samples associated with the first appointment of the appointment pair to the voice print associated with the second appointment of the appointment pair. For each of the comparisons, a raw comparison score is generated. The system uses the raw comparison scores to compute a composite score for the appointment pair. The system then determines whether the composite score satisfies a predetermined threshold condition indicative of a threshold likelihood of imposture between the appointment pair. If the composite score satisfies the threshold condition, the system determines whether the raw comparison scores satisfy a first set of criteria, where satisfaction of the first set of criteria represents a first likelihood of imposture between the appointment pair. If the raw comparison scores satisfy the first set of criteria, the system associates an indicator with the appointment pair to represent a detection of imposture between the appointment pair. The indicator may trigger a system response or a human response to the detection of imposture between the appointment pair, such as perform further evaluations or withhold from distribution any evaluations (e.g., test results) of the appointment pair.

Exemplary systems comprising a computer processing system and a memory for carrying out the method are also described. Non-transitory computer readable media having instructions adapted to cause a processing system to execute the exemplary approaches are also described.

DETAILED DESCRIPTION

Systems and methods described herein improve upon fraud detection technology by providing robust and efficient ways for machines to automatically detect imposters in situations requiring verbal responses (especially large settings such as standardized tests). The systems and methods can be implemented using any suitable combination of hardware, software, and/or firmware using algorithms implemented in any suitable programming language such that a processing system of a computer system is configured to carry out the exemplary approaches described herein.

Figure 1:
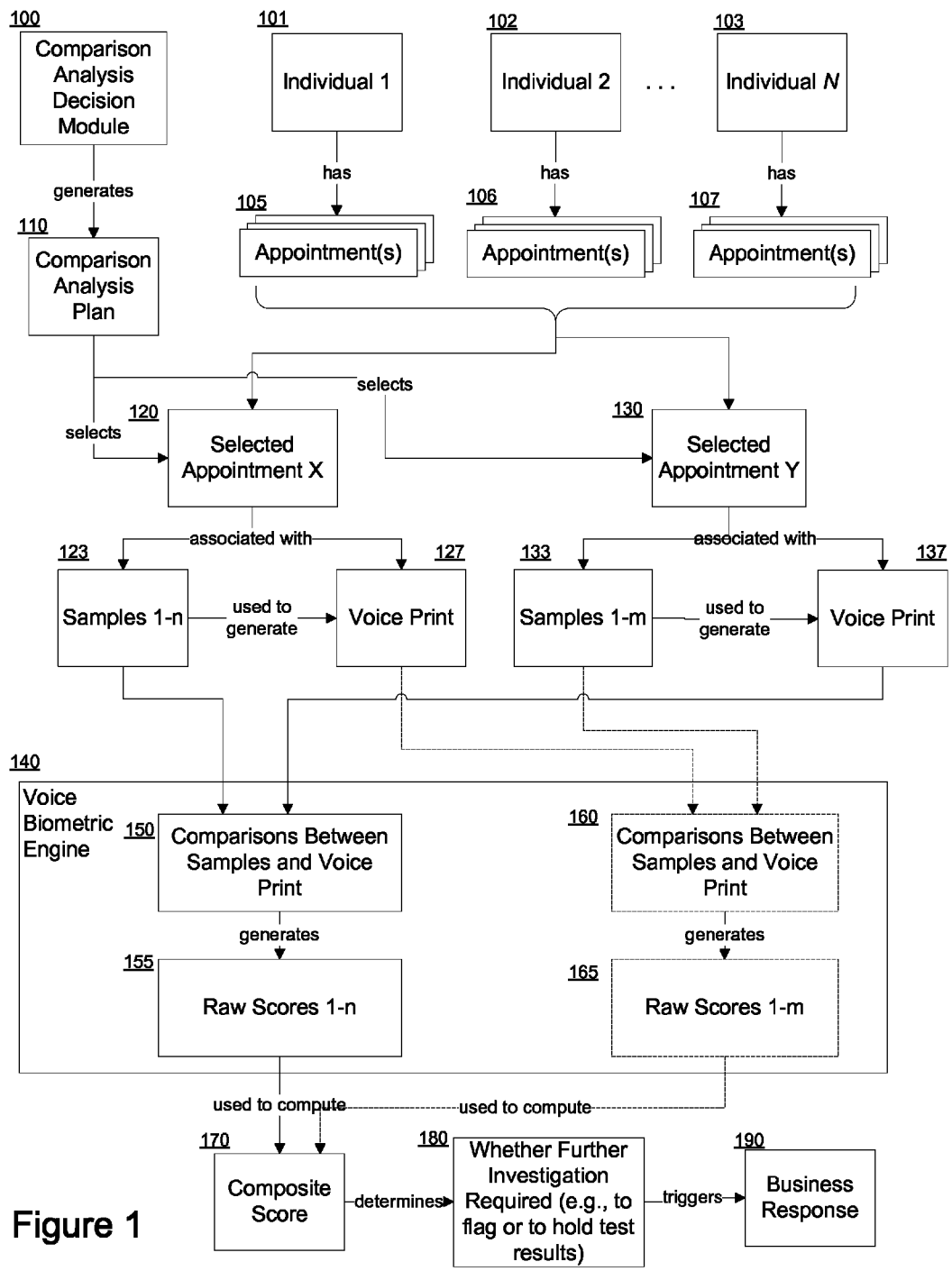
FIG. 1 is a block diagram depicting various aspects of a voice response analysis engine for detecting imposters.

FIG. 1 is a block diagram depicting various aspects of an exemplary voice response analysis engine for detecting imposters, which may be implemented using a suitable computer processing system, such as one or computer processing systems (e.g., central processing units—CPUs) located in one or more computers that may communicate with one another. One exemplary application of the voice response analysis engine is to detect imposters in a test/exam setting that requires verbal responses (e.g., registered test taker Alex may ask Bob to take the exam in Alex's stead). Individuals 1 through N (represented by labels 101 to 103 in FIG. 1) may each be a test taker registered to take an exam. Each individual may have one or more "appointments" (represented by labels 105 to 107 in FIG. 1), which refer to instances—whether past or present—where voice recordings for the associated individual was/is taken. For example, an appointment may be a particular exam, exam segment, interview, event, occasion, and/or the like, and each appointment may be associated with a particular time, time frame, location, test center, and/or the like. In the test-taking scenario, each individual test taker may have an appointment for that test, and depending on each individual's testing history, he/she may have had appointments for past tests.

The voice response analysis engine may be implemented to accommodate a variety of analysis preferences or objectives. For example, a test administrator for a particular test may want to the system to detect imposters or fraudulent activity within that test. As another example, the test administrator may have a list of known imposters and would like to check whether any of them are taking the current test. In yet another example, in situations where known repeat test takers are present (e.g., ones who have taken the same or a different test before), the test administrator may want to ensure that the current test taker is the same person who had taken the previous tests. As another example, a situation could arise where a fraud detection agency receives separate transmissions of appointments that need to be analyzed together (e.g., because they were all taken at the same test center). This may occur because data transmission takes time (due to technological factors or human factors), and it would be more efficient for the fraud detection agency to proceed to analyze the data at hand (even if it is not 100% of the total data) rather than wait for all the data to arrive. For example, the fraud detection agency may begin fraud detection as soon as a certain percentage (e.g., 95%) of the appointments have been received, and subsequently analyze the remainder when they become available. In this case, the late-received appointments should be analyzed in such a way to ensure that the corresponding new test takers are not engaged in fraudulent activities with each other nor with any of the existing/prior test takers. To accommodate other possible analysis requirements, the system may also have the capability to allow users to create custom-defined ad hoc analyses.

When using the system, the user may input commands into a comparison analysis decision module 100 to specify the desired analysis (e.g., via keyboard text input, drop-down menu selection, command line parameters, and any other user interface known of one skilled in the art). In some implementations, the user may also specify the data sources where appointments, voice samples, and voice prints may be found (e.g., a database containing entities representing individuals 101-103 and their associated appointments and voice prints). While voice prints may be generated on the fly, it is preferable to persist and reuse generated voice prints in a data source to improve system efficiency.

Based on the user input and/or data, the comparison analysis decision module 100 may generate a suitable comparison analysis plan 110. For example, the comparison analysis plan 110 may specify which pairs of appointments are to be compared (e.g., appointment X 120 and appointment Y 130 are to be compared). Each selected appointment (e.g., 120 or 130) may be selected from the appointments 105-107 of the individuals 101-103, as well as other sources (e.g., the test administrator may have a separate known list of known imposters and their associated voice recordings). In some implementations, the comparison analysis plan 110 may defined explicit pairs of appointments to be compared (e.g., appointment X is to be compared to appointments A, B, C, etc.). Alternatively, the comparison analysis plan 110 may define a comparison rule and identify a set or sets of appointments that would be compared according to the comparison rule. For example, one comparison rule may specify that each appointment in a set is to be compared to every other appointment in that set, except to the appointment itself. As an illustration, if the set includes appointments {X, Y, Z}, the following comparisons may be performed according to that rule: (X, Y), (X, Z), and (Y, Z). The comparison between two appointments may be bi-directional, which means that the voice samples of the first appointment may be compared to the voice print of the second appointment, and the voice samples of the second appointment may be compared to the voice print of the first appointment. As another example, a comparison analysis plan 110 may include two disjoint sets of appointments and a comparison rule specifying that each appointment in the first set is to be compared to each appointment in the second set. For example, if the first set includes appointments {X, Y, Z} and the second set includes appointments {A, B}, the comparison pairs would the following according to that comparison rule: (X, A), (X, B), (Y, A), (Y, B), (Z, A), (Z, B). Each comparison may be bi-directional or uni-directional. If a uni-directional comparison rule is adopted for two-set cases, the voice samples of an appointment in the first set would be compared to the voice print of an appointment in the second set, but the voice samples of appointment in the second set would not be compared to the voice prints of the appointment in the first set. Using the last example for illustration, the voice samples of X would be compared to the voice print of A, but the voice samples of A would not be compared to the voice print of X.

In some embodiments, the system perform comparisons according to the comparison analysis plan 110. For example, the comparison analysis plan 110 may specify that appointment X 120 is to be compared with appointment Y 130 (appointments X and Y may be associated with different individuals or the same individual). Each appointment may be associated with any number of voice samples, which may be recorded/extracted from audio, video, or audiovisual files. As an illustration, appointment X may be associated with voice samples 1 to n (label 123), and appointment Y may be associated with voice samples 1 to m (label 133). A voice sample may be, e.g., a segment of a voice recording of an individual taken during an appointment or a voice recording extracted from an audiovisual recording. For example, during appointment X 120, voice recordings of the associated individual (e.g., 101) may be taken and used to extract the voice samples 123. Similarly, during appointment Y 130, voice recordings of the associated individual (e.g., 103) may be taken and used to extract voice samples 133. Each appointment (e.g., 120 or 130) may be associated with a voice print (e.g., 127 or 137, respectively), which may be generated from the associated voice samples (e.g., 123 or 133, respectively). In some implementations, a voice print may be automatically generated using suitable voice biometric tools (e.g., such as those available from Voice Biometrics Group or other commercially available voice print technology). The voice print (e.g., 127 or 137) may be persisted once generated so that the same task need not be repeated. The voice samples and voice prints may be remotely stored or locally stored on the system.

Appointment comparisons may be performed using a voice biometric engine 140. For example, when appointment X 120 and appointment Y 130 are being compared, the system may invoke voice biometric engine 140 to perform a uni-directional comparison or a bi-directional comparison. In a uni-directional comparison of appointment X 120 to appointment Y 130, the voice samples 123 of appointment X 120 may be compared 150 to the voice print 137 of appointment Y 130, but the voice samples 133 of appointment Y 130 would not be compared to the voice print 127 of appointment X 120. In a bi-directional comparison of appointment X 120 and appointment Y 130, however, the voice samples 123 of appointment X 120 may be compared 150 to the voice print 137 of appointment Y 130, and the voice samples 133 of appointment Y 130 would be compared 160 to the voice print 127 of appointment X 120.

In some implementations, the voice biometric engine 140 may output a raw score 155 for each comparison between a voice sample and a voice print. The raw score 155 is a measure of how closely the voice sample matches the voice print. For example, a high raw score may indicate that the individual associated with the voice sample and the individual associated with the voice print are likely the same person; conversely, a low raw score may indicate that the two are different persons. As illustrated in FIG. 1, the result of comparing 150 the voice samples 1-n (label 123) of appointment X 120 to the voice print 137 of appointment Y 130 is a set of corresponding raw scores 1-n (label 155). If a bi-directional comparison was performed, the voice biometric engine 140 may also output raw scores 1-m (label 165), which correspond to comparisons 160 between the voice samples 1-m (label 133) of appointment Y 130 and the voice print 127 of appointment X 120. Comparing voice samples to voice prints at 150 and/or 160, or as elsewhere referred to herein, may be carried out using any suitable computer-based comparison algorithm, such as those commercially available, e.g., from Voice Biometrics Group or others, and/or conventionally known to those of ordinary skill in the art. For instance, such comparing may involve recording speech samples and generating speech signal waveforms of the speech, extracting speech features, generating and training one or more computer-based models (e.g., voice prints) based on the features, and then carrying out pattern matching to compare speech samples, e.g., against a voice print. Such computer based approaches are known in the art. See, e.g., Research on Voiceprint Recognition, 2012 International Conference on Electrical and Computer Engineering, *Advances in Biomedical Engineering*, Vol. 11, 2012, pp. 212-216, the entire contents of which are incorporated herein by reference.

In some embodiments, for efficiency purposes a composite score 170 may be computed for each pair of appointments compared. In some implementations, a composite score 170 may be a weighted sum of all the individual raw scores (155 and/or 165) generated from comparisons (150 and/or 160) between the appointment pair (120 and 130). For example, in uni-directional comparisons, the composite score 170 for appointment pair X 120 and Y 130 may be calculated based on raw scores 1-n (label 155). For bi-directional comparisons, the composite score 170 for appointment pair X 120 and Y 130 may be calculated based on raw scores 1-n (label 155) and raw scores 1-m (label 165). In some implementations, the composite score 170 may be calculated by applying each raw score (e.g., 155 and/or 165) to a banded lookup table and summing the corresponding band/weight values. In some implementations, the predetermined band value or weight may be set to be proportionally larger as the associated raw score range deviate further from an empirically determined norm (e.g., the observed mean). An example of a lookup table is presented below, with several raw score ranges (each range is represented by the terminating values FROM_VAL_NO and TO_VAL_NO) and the corresponding band or weighted value (denoted PRORTY_WGT_NO):

| FROM_VAL_NO (inclusive) | TO_VAL_NO (exclusive) | PRORTY_WGT_NO |
|---|---|---|
| −999 | 0 | 0 |
| 0 | 100 | 1 |
| 100 | 250 | 5 |
| 251 | 999 | 8 |

Each of the raw scores (e.g., 155 and/or 165) may fit within a range in the above table, and the corresponding band value or weight may be aggregated to compute the composite score 170. As an illustration, if appointment X 120 and appointment Y 130 are bi-directionally compared, and each appointment has six voice samples (represented by x1-x6 and y1-y6, respectively), the following may the result using the above lookup table:

| Appointment ID of Voice Sample | Voice Sample ID | Appointment ID of Voice Print | Raw Score | PRORTY_WGT_NO |
|---|---|---|---|---|
| X | x1 | Y | 20 | 1 |
| X | x2 | Y | −100 | 0 |
| X | x3 | Y | −200 | 0 |
| X | x4 | Y | 0 | 0 |
| X | x5 | Y | 0 | 0 |
| X | x6 | Y | 250 | 5 |
| Y | y1 | X | 251 | 8 |

-continued

| Appointment ID of Voice Sample | Voice Sample ID | Appointment ID of Voice Print | Raw Score | PRORTY_WGT_NO |
|---|---|---|---|---|
| Y | y2 | X | 0 | 0 |
| Y | y3 | X | 0 | 0 |
| Y | y4 | X | 0 | 0 |
| Y | y5 | X | 0 | 0 |
| Y | y6 | X | 0 | 0 |
| Calculated Composite Score for Comparison Pair (X, Y) | | | 14 | |

The composite score 170 for an appointment pair, along with the associated raw scores (155 and/or 165), may be used for fraud detection. Depending on the particular fraud-detection scenario, a composite score 170 representing either a positive match (signifying similar appointments) or a negative match (signifying different appointments) may signal fraud. For example, fraud may be signaled by similarity criteria in scenarios involving intra-test center imposter analysis, since test takers in the test center are expected to have different voices. Thus, if any two voice recordings in the test center are sufficiently similar, it may suggest that one test taker is taking the test for the other, or a single imposter is taking the test for two or more different candidates. In another example where a test taker is a known repeat test taker, fraud may instead be signaled by difference criteria, because the expectation is that the test taker's voice in the current test should match his voice in the previous test(s). If the test taker's voices do not match, then there may be an increased likelihood of fraud. As will be described in more detail below, the composite score 170 as well as the associated raw scores (155 and/or 165) may be used to determine whether further investigation is necessary to determine the existence of fraud, and/or whether the risk of fraud is sufficient to warrant flagging the appointments or withholding evaluation scores assigned to the appointments 180. That determination optionally may trigger appropriate business responses 190. For example, an appointment may be annotated with a "suspect flag" to indicate need for further investigation, or a command message may be sent to the appropriate registration system to withhold the suspect test taker's evaluation score.

Figure 2:
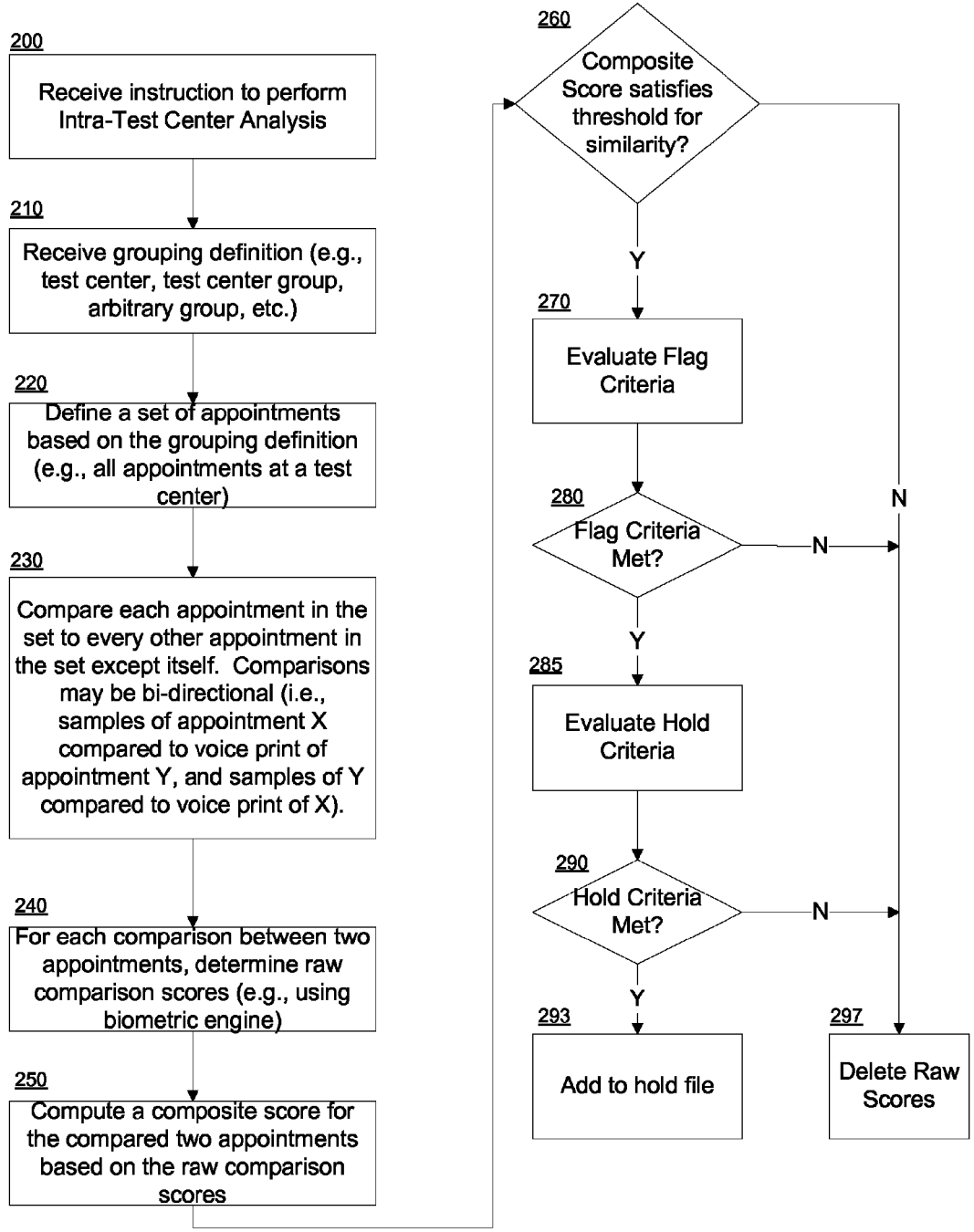
FIG. 2 is a flow diagram depicting a computer-implemented method of detecting intra test center imposture.

FIG. 2 is a flow diagram depicting an exemplary computer-implemented method of detecting intra test center imposture. This analysis is designed to detect imposters in situations where each voice recording should, absent of fraud, map to a single unique person. Such situations may often arise in test settings (e.g., a particular test being administered at a test center), for example. In one embodiment, the voice response analysis system may receive instructions from the user (e.g., test administrator) to perform intra-test center analyses 200. The system may also receive a grouping definition 210 (e.g., a test center, a group of individuals at a test center, a group of test centers, etc.), which may guide the system to define a set of appointments on which the intra-test center analyses would be performed. For example, if the grouping definition is a particular test on a particular date at a particular test center, the system may define a set of appointments that includes every registered test taker for that test. Having been instructed to perform intra-test center analyses, the system may automatically generate an appropriate comparison plan. Then based on the comparison plan, the system may compare each appointment in the defined set to every other appointment in the set, except to the appointment itself 230. As an illustration, if a hypothetical set contains appointments {X, Y, Z} and each appointment's voice samples and voice print are designated by the suffix -vs and -vp, respectively, the following pairs of bi-directional comparisons may be made: (X-vs, Y-vp), (X-vs, Z-vp), (Y-vs, X-vp), (Y-vs, Z-vp), (Z-vs, X-vp), (Z-vs, Y-vp). As described above, a voice biometric engine may be invoked to compare a voice sample to a voice print and output a corresponding raw comparison score. For each pair of appointments compared, the associated raw scores may then be used to compute a composite score for the appointment pair 250. For example, for appointment pair (X, Y), the raw scores associated with the following comparisons may be used to compute the composite score: (X-vs, Y-vp), and (Y-vs, X-vp). As described above, the raw scores may be weighted or converted to weighted values prior to being aggregate (e.g., by summing, taking the average, etc.).

After a composite score is computed for a given pair of appointments, a series of tests may then be performed to determine whether there exists a sufficient likelihood of fraud. Performing the tests, however, may be computationally expensive, especially due to the large amounts of data. For example, performing bi-directional comparisons between appointments within a single set may require comparisons between n(n−1) appointment pairs, where n is the number of appointments in the set. As an illustration, if a set includes 3 appointments, 6 appointment pairs would have to be compared; similarly, if the set includes 1000 appointments, 999,000 appointment pairs would have to be compared. In addition, comparing each comparison pair entails comparing a voice print to multiple voice samples. If the set of 1000 appointments each have 10 voice samples, the number of comparisons between voice samples and voice prints would be 9,990,000, which means there would also be 9,990,000 corresponding raw scores. Since fraud detection logic may involve in depth analyses (e.g., a chain of comparison statements) of raw scores, the process could be computationally expensive.

The embodiments described herein for analyzing scores to detect fraud provide significant computational savings. For instance, the analyses of the scores may be performed in stages. When analyzing the comparison results between two appointments, a first threshold determination may be made 260 using the associated composite score described above. By using the composite score, a single comparison between the composite score and a threshold value is all that is needed to determine whether the threshold condition is met. In contrast, if the threshold condition is based on raw scores, multiple comparisons may be needed, which would be more computationally taxing.

Under the intra-test center analysis, the expectation is that, absent fraud, test takers in a test center or of a given test should all be different individuals and have different voices. Thus, appointments that are overly similar may signal fraud (e.g., an imposter test taker may be taking the test for another test taker). Accordingly, in one implementation, the threshold condition for intra-test center analyses may be a similarity criteria. That is, if a pair of appointments are sufficiently similar, additional evaluations may be needed 260 (at Yes); conversely, if the appointments are insufficiently similar, then no further investigation may be necessary 260 (at No). In an implementation where similarity is reflected by high composite scores, the threshold condition may be a lower bound for composite scores (in other words, a composite score must be at least the lower bound value to warrant additional evaluation). If the threshold is not met 260 (at No), the associated raw scores and/or composite scores may be deleted 297. If, on the other hand, the threshold is met 260 (at Yes), further evaluations may be warranted. Given that fraudulent activity is a small minority, this threshold criteria can filters out the vast majority of appointments such that they do not need to undergo further computationally expensive evaluations.

Further evaluations of the appointment pair may be performed in stages to further limit computational resources. In some embodiments, an appointment pair whose corresponding composite score satisfies the threshold criteria 260 may first be evaluated by flag criteria 270. The flag criteria 270 may include a series of predetermined conditions for analyzing an appointment pair's raw scores. For example, the flag criteria 270 may require a certain percentage of the individual raw scores to each exceed a certain threshold (to signal sufficient similarity). If the flag criteria are not met 280 (at No), the appointment pair would no longer be subject to scrutiny under the intra-test center analysis and the associated raw scores and/or composite score may be deleted 297. If, on the other hand, the flag criteria are met 280 (at Yes), a flag may be associated with the appointment pair to notify reviewers to further investigate the appointment pair and/or trigger the system to perform additional automated evaluations.

In some embodiments, hold criteria 285 may be applied to the appointment pair whose raw scores satisfied the flag criteria 270. Hold criteria 285 may be applied to the raw scores to determine whether evaluation scores for the appointment pair (e.g., test scores/results) should be withheld. The hold criteria 285, for example, may be more stringent than the flag criteria 270 (e.g., a certain percentage of high raw scores may be required in both comparison directions) and may require one or more other analyses to confirm that fraud is likely (e.g., one or more of the other analyses described herein may be required to also signal a likelihood of fraud, such as the known imposter list analysis, repeat test taker analysis, intra-test center late arrival analysis, etc.). If the hold criteria are met 290 (at Yes), an entry may be added to a hold file 293 to indicate that the evaluation scores associated with the appointment pair should be withheld from distribution. If, on the other hand, the hold criteria are not met 290 (at No), the associated raw scores and composite scores may be deleted if no additional evaluations are needed 297. While applying the hold criteria may be computationally expensive, the cost is minimized since the vast majority of appointment pairs typically would have been filtered out by the threshold condition 260 and flag criteria 270.

The aforementioned flag criteria and hold criteria may be implemented in a variety of ways. In one implementation, the criteria are designed to take into consideration the possibility of bad voice samples. For example, some test takers may have missing or incomplete voice samples. As another example, a test taker may have outlier voice samples (e.g., one of the six voice samples when compared to a voice print may exhibit a raw score that is very inconsistent with that of the other five voice samples). This variability among the samples may often be explained by background noise or other features no related to the voice in the sample. Due to the situations noted above, a simple average or sum of the raw scores from comparing the speech samples to a voice print might not reflect the true match of the samples with the voice print. At the same time, identifying maximum or minimum scores for flagging might be misleading if the samples vary in quality. Thus, it may be desirable to implement the flagging and/or holding criteria such that evidence strength is balanced with the amount of evidence available.

As an example, criteria tables may be used to allow the system to flag/hold based on either strong evidence from fewer samples or slightly weaker evidence from all samples. For example, if fraud is signaled by similarity, the flag/hold criteria may be triggered if any of the following is satisfied: 12 samples have scores of 220 or above; 10 samples have scores 240 or above; 8 samples have scores of 255 or above; 6 samples have scores of 270 or above; and 4 samples have scores of 285 or above. As another example, if fraud is signal by difference, the flag/hold criteria may be triggered if any of the following is satisfied: 12 samples have scores of 120 or below; 10 samples have scores 110 or below; 8 samples have scores of 100 or below; 6 samples have scores of 75 or below; and 4 samples have scores of 60 or below.

Figure 3:
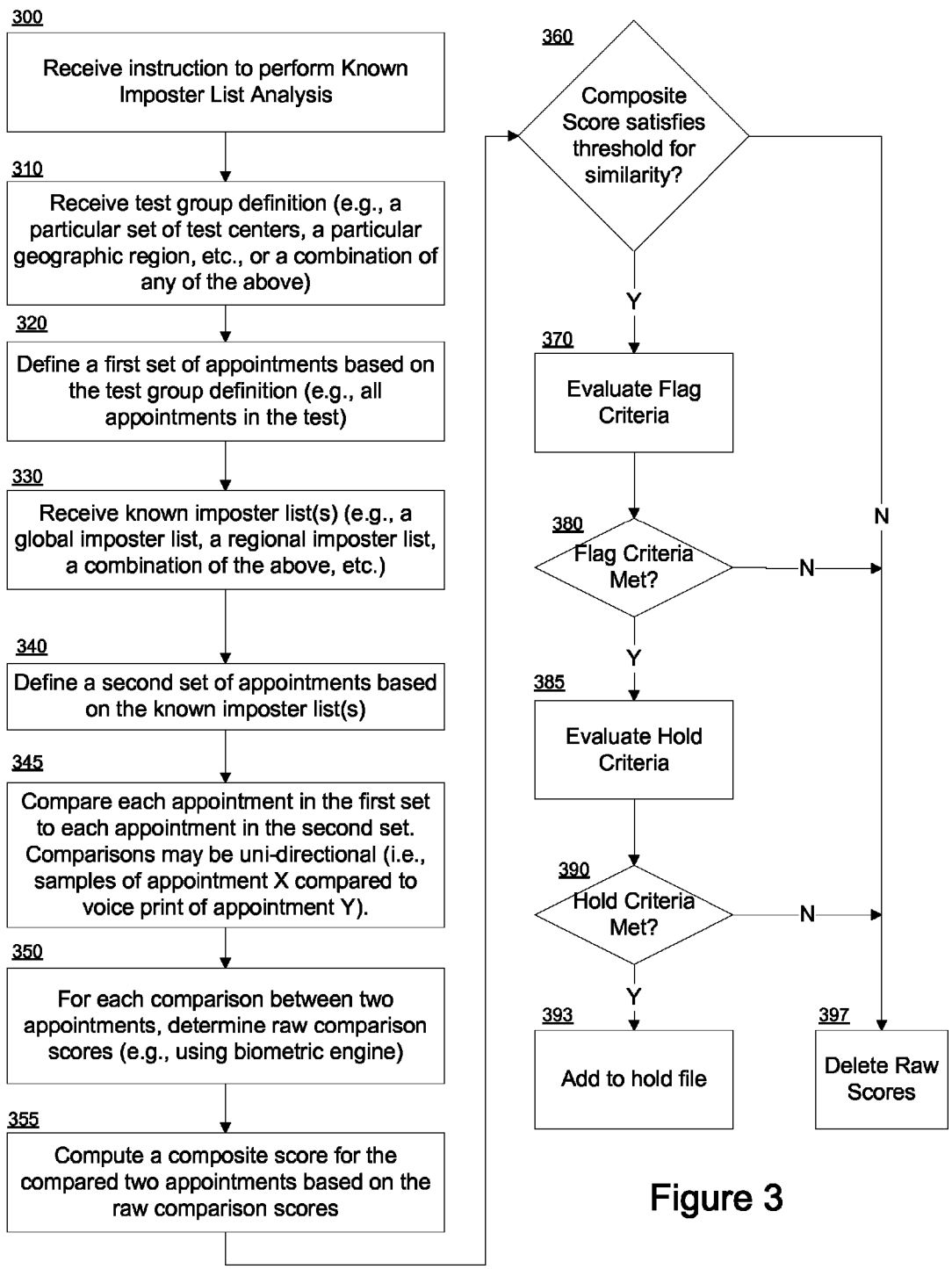
FIG. 3 is a flow diagram depicting a computer-implemented method of detecting imposture by known imposters.

FIG. 3 is flow diagram depicting an exemplary computer-implemented method of detecting imposture by known imposters. This method may be useful in situations where the user (e.g., test administrator) has a list of known imposters. Conceptually, if a current test taker's voice samples match the voice signature of a known imposter, then the associated appointment of the current test taker would be suspect. In some implementations, the system may receive instructions from the user to perform a known imposter list analysis 300. The user may define a particular group being evaluated (e.g., a group of test takers, a test center, a group of test centers, particular geographic regions, etc., or a combination of such definitions) 310. Based on the group definition, the system may define a set of appointments (e.g., each appointment may correspond to a registered test taker test for a test) 320. The system may further receive one or more lists of known imposters (e.g., a known global imposter list, a regional imposter list, a combination of global and regional imposter lists, etc.) 330 and define a second set of appointments based on the list(s) (e.g., the second set may include the last five appointments of each known imposters) 340. The comparison plan associated with the known imposter list analysis may cause a processing system to compare each appointment in the first set (the current appointments) to each appointment in the second set (the known imposters' appointments) 345. In some implementations, the comparisons may be uni-directional. As an illustration, if a hypothetical first set contains current appointments {X, Y, Z} and a second set of appointments of known imposters contains {A, B}, and each appointment's voice samples and voice print are designated by the suffix -vs and -vp, respectively, the following pairs of uni-directional comparisons may be made: (X-vs, A-vp), (Y-vs, A-vp), (Z-vs, A-vp), (X-vs, B-vp), (Y-vs, B-vp), (Z-vs, B-vp). As described above, a voice biometric engine may be invoked to compare voice samples to voice prints. In some implementations, the voice biometric engine may return a raw score for each comparison between a voice sample and a voice print 350. Then for each pair of appointments compared (e.g., (X,A), (X,B), (Y, A), etc.), a composite score may be computed, as described above, based on the raw scores associated with the appointment pair 355.

Once a composite score has been computed for a appointment pair, the system may perform a series of evaluations to detect fraud. Under the known imposter list analysis, fraud may be signaled by detected similarity between a test taker's appointment (e.g., from the aforementioned first set of appointments) and a known imposter's appointment (e.g., from the aforementioned second set of appointments). Thus, a composite score may first be compared to a composite score threshold 360 to determine whether the composite score is sufficiently high (i.e., indicative of similarity) to warrant further evaluation. In implementations where composite scores are directly proportional to similarity, the composite score threshold may be a lower bound composite score value. If the threshold is not met 360 (at No), the associated raw scores and/or composite score may be deleted if no further processing is needed 397. If, on the other hand, the threshold is met 360 (at Yes), then further evaluation may be performed. One such evaluation, as described above, is the flag criteria evaluation 370. This evaluation may apply a set of criteria to the raw scores associated with the appointment pair. If the criteria are not met 380 (at No), then no further analysis under the known imposter list analysis may be needed 397. On the other hand, if the criteria are met 380 (at Yes), then as described above a logical flag may be associated with the appointment pair to indicate that further human or system investigation/evaluation may be needed. Also as described above, one such further evaluation may include the application of hold criteria 385 to the appointment pair's raw scores. If the hold criteria are not met 390 (at No), then no further evaluation may be needed under the known imposter list analysis and the associated scores may be deleted 397 if desired. On the other hand, if the hold criteria are met 390 (at Yes), then in some implementations an entry may be added to a hold file 393 to indicate that evaluation scores associated with the current appointment in the appointment pair should be withheld from distribution. Again, as described above, performing a tiered evaluation of the scores can provide significant computational savings given the relatively low likelihood of fraud occurring.

Figure 4:
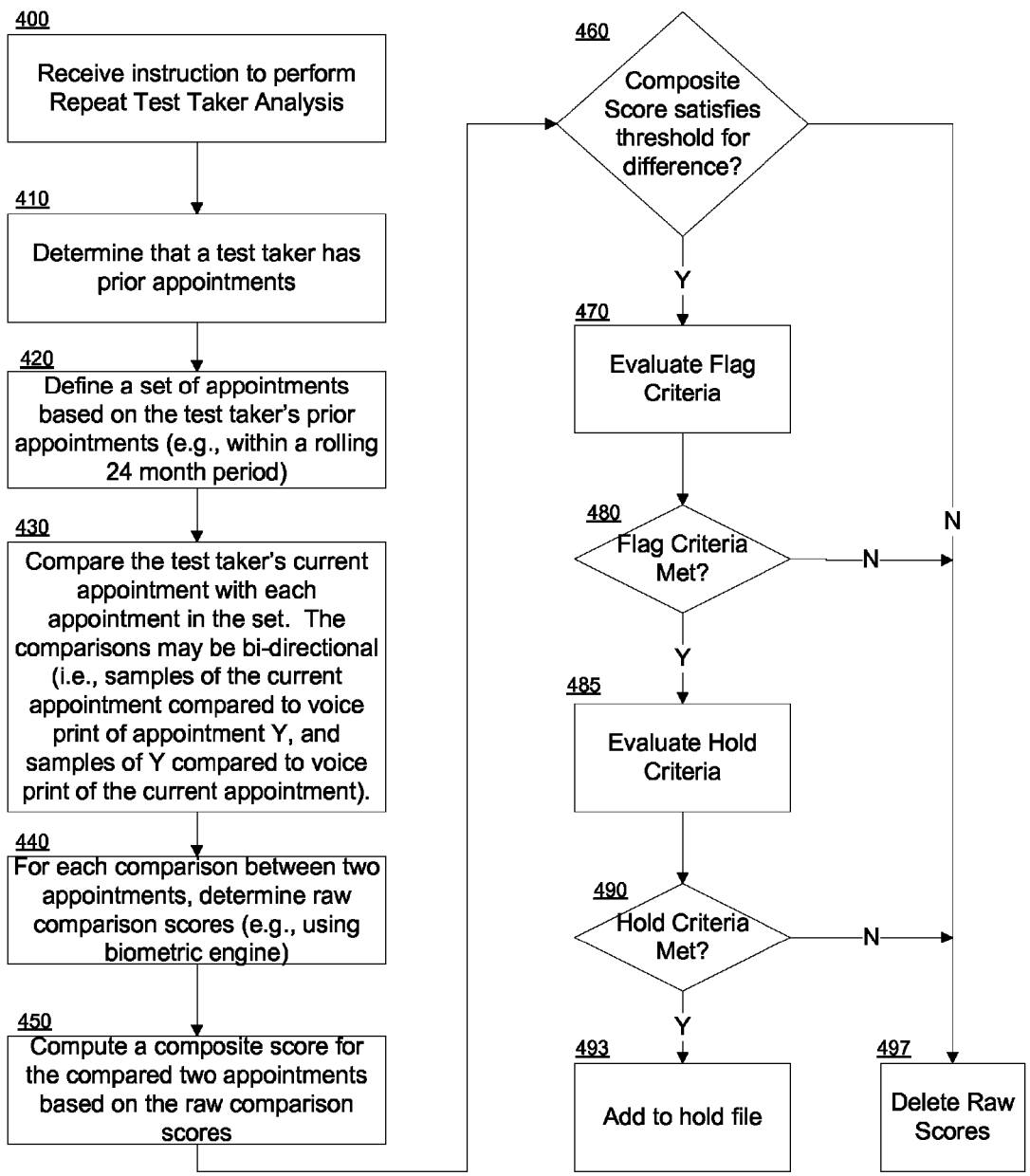
FIG. 4 is a flow diagram depicting a computer-implemented method of detecting imposture for repeat test takers.

FIG. 4 is a flow diagram depicting a computer-implemented method for detecting imposture for repeat test takers. This method may be useful in situations where the system can identify a test taker as a repeat test taker and has his voice signatures from prior appointments. The system may compare the repeat test taker's current voice recordings with prior voice signatures to determine whether they are consistent. The expectation is that the voice signatures should be sufficiently similar; if they are not, that may be a signal for fraud.

In one embodiment, the system may receive instructions from a user indicating a desire to perform a repeat test taker analysis 400. In some implementations, the user may inform the system of the identities of those repeat test takers, or the system may make that determination itself 410 by, e.g., querying a database containing historical test taker appointment data. For a test taker with prior appointment data, the system may select one or more of the prior appointments to form an appointment set 420. In one implementation, all prior appointments may be selected; in another implementation, certain rules may guide the selection (e.g., the appointments within a rolling 24 month period would be selected). Once the set is defined, the system may compare the test taker's current appointment with each prior appointment in the set 430. The comparison may be uni-directional or bi-directional. In an example where the current appointment, designated by C, is bi-directionally compared to each of the prior appointment in set {X, Y}, and each appointment's voice samples and voice print are designated by the suffix -vs and -vp, respectively, the following pairs of comparisons may be made: (C-vs, X-vp), (C-vs, Y-vp), (X-vs, C-vp), (Y-vs, C-vp). As described above, a voice biometric engine may be invoked to compare the voice samples to the voice prints and generate corresponding raw comparison scores 440. Also as described above, a composite score may be computed for each pair of compared appointments (e.g., (C,X) and (C,Y)) using the associated raw scores 450.

Under the repeat test taker scenario, the expectation is that the repeat test taker's current appointment should match all of his previous appointments; any mismatch may signify fraud. Thus, in an implementation where composite scores are directly proportional to similarity (i.e., a high score represents similarity, a low score represents dissimilarity), an exemplary composite score threshold may be a predetermined upper bound for composite scores. During fraud detection, if a composite score for an appointment pair is below the upper bound threshold (the composite score is sufficiently low to indicate a dissimilarity), then fraud may be likely and further evaluation may be required 460 (at Yes). On the other hand, if the threshold is not met (the composite score is high, indicating similarity) 460 (at No), then no additional evaluation under the repeat test taker analysis may be needed and the associated raw scores and/or composite score may be deleted 497. As described above, filtering out non-suspect appointment pairs using composite scores can significantly decreases computation time, since the vast majority of appointment pairs would likely be filtered out and would not need to undergo further evaluations that are more computationally expensive.

Further evaluations of the appointment pair may be performed in stages to further provide computational savings. In some embodiments, flag criteria 470 may be applied to the raw scores of the appointment pair to first determine whether further system or human evaluation is needed. In some implementations, the flag criteria 470 may require, e.g., at least a certain percentage of raw scores to each satisfy a threshold (e.g., at least 60% of the raw scores must be below a certain threshold to trigger the flag criteria). If the flag criteria are not met 480 (at No), then in some implementations no further evaluation under the repeat test taker analysis would be performed and the associated scores may be deleted 497. On the other hand, if the flag criteria are met 480 (at Yes), then the appointment pair may be flagged so that further human evaluation or system evaluation may be performed. In one embodiment, further system evaluation may include applying hold criteria 485 to the raw scores to determine whether evaluations scores (e.g., test scores/results) should be placed on hold 485 (e.g., not released to the score users, such as schools, employers, etc.). The hold criteria may have more stringent mismatch requirements (e.g., at least 80% of the raw scores must be below a certain threshold to satisfy the hold criteria), and may require one or more separate analyses (e.g., intra-test center analysis, known imposter list analysis, etc.) to confirm the likelihood of fraud. If the hold criteria are met 490 (at Yes), then in some implementations a hold entry may be added to a hold file 493 to signal that evaluation scores for the current appointment ought to be withheld from distribution. If the hold criteria are not met 490 (at No), then evaluation of the comparison pair under the repeat test taker analysis may terminate and the associated scores may be deleted if no longer needed 497.

Figure 5A:
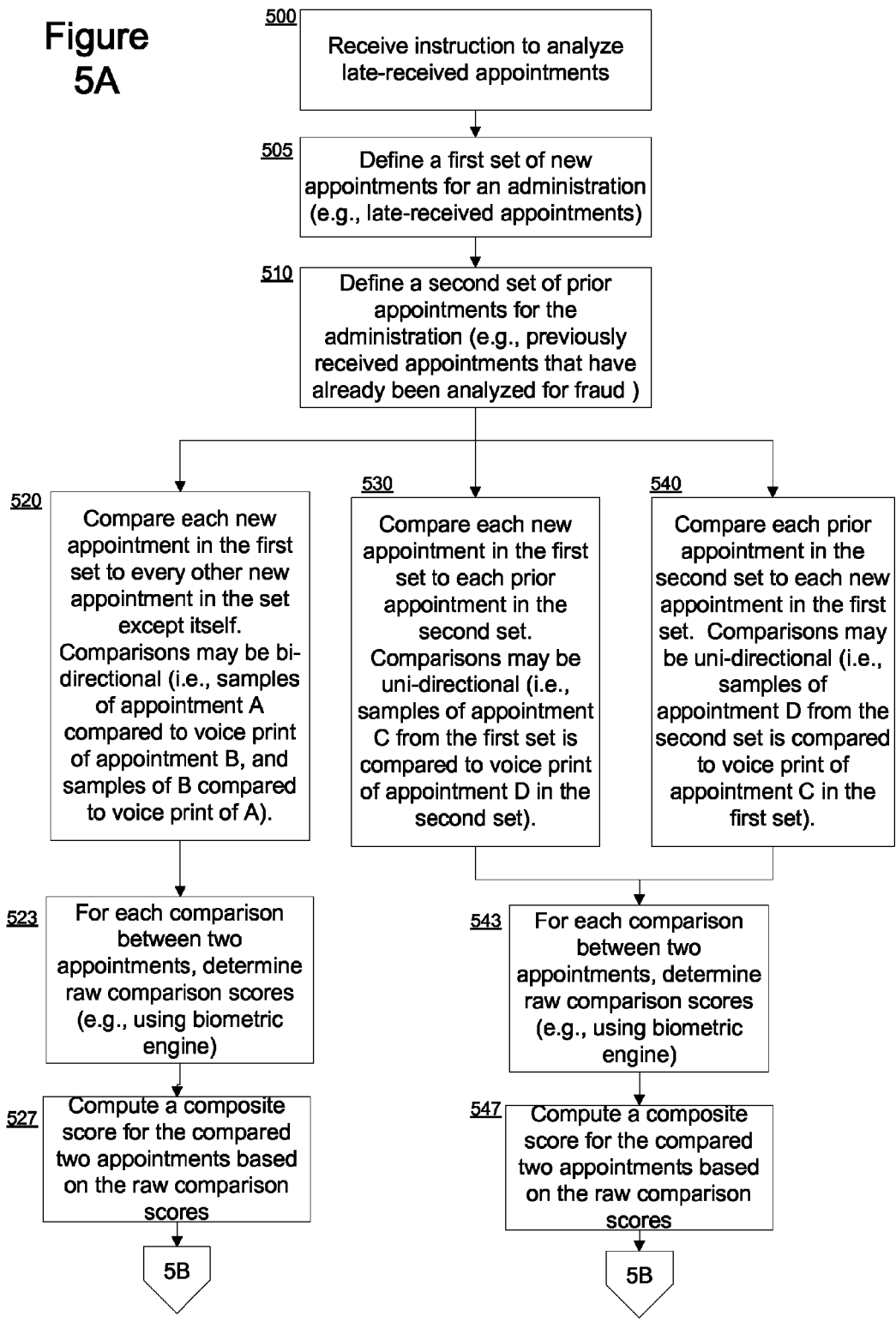
FIGS. 5A-5B are flow diagrams depicting an exemplary computer-implemented method of detecting imposture in situations involving late-received appointments.
Figure 5B:
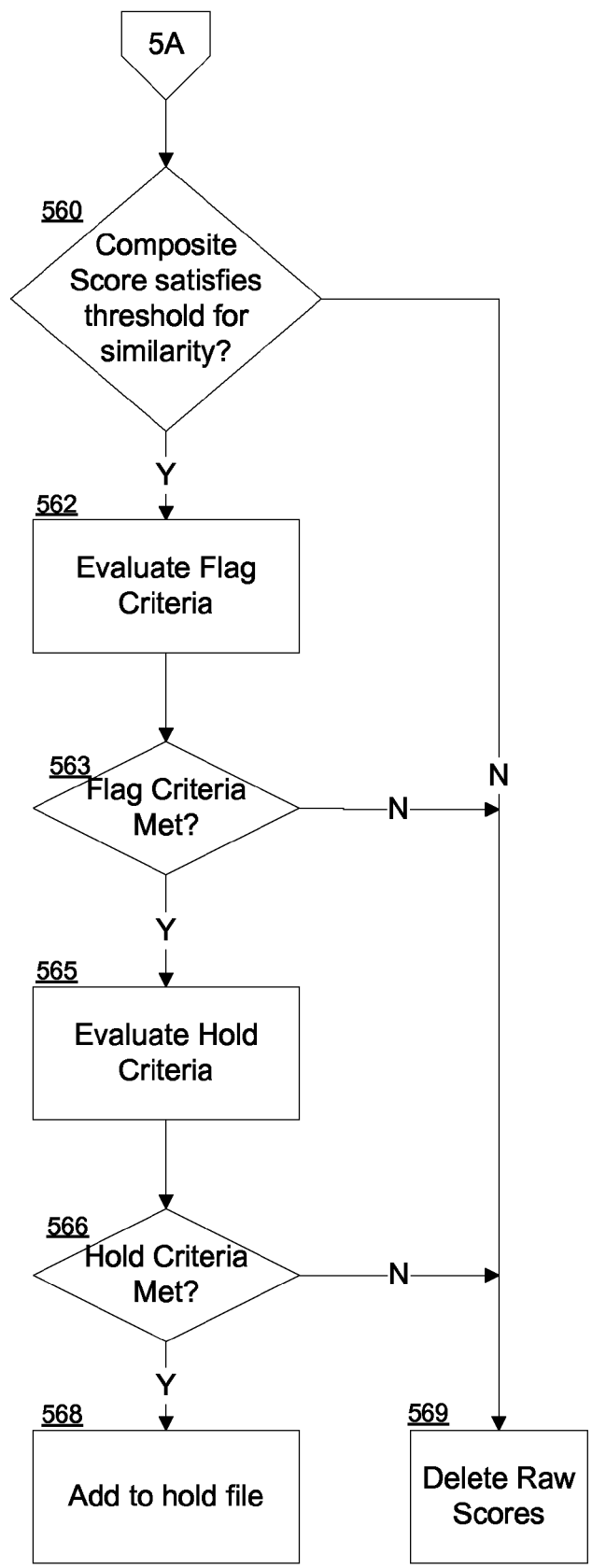

FIG. 5A-5B are flow diagrams depicting an exemplary computer-implemented method of detecting imposture in situations involving late-received appointments. In general, this method may be applicable in situations where fraud detection analyses have already been performed on a group, but additional analyses are necessary due to new entrants to the group. As an example, due to time constraints and efficiency reasons, the fraud detection system may proceed to analyze a subset of appointments before the full set is available, even though the full set should be analyzed together for thoroughness (e.g., everyone in a defined group, such as a test center, should be compared to each other). This may occur, for example, due to transmission delays caused by technological (e.g., data transmission rate) and/or human factors. Whatever the reason, it may be desirable to proceed to analyze the available appointments and follow up with subsequent analyses once the remaining appointments become available. In this situation, subsequent fraud detection analyses should be performed to ensure that the new test takers are not committing fraud, without repeating the analyses that has already been done on the previously available data. For example, given a new appointment X and existing appointments Y and Z, X should be compared to Y and Z, but Y and Z need not be compared to each other since it was already done prior to X's late arrival.

FIG. 5A depict one exemplary embodiment for performing appointment comparisons in situations involving late-received appointments. In one implementation, the system may receive instructions from the user to perform such analysis 500. The system may also receive from the user or from an automated registration system a list of new appointments (e.g., late-received appointments) and a list of prior/existing appointments (e.g., previously received appointments that have already been analyzed for fraud). Based on the information, the system may define a first appointment set that includes the new appointments (e.g., late-received appointments) 505 and a second appointment set that includes the existing appointments (e.g., previously received appointments) 510. The appointments in these appointment sets may then be compared according to a comparison plan for detecting fraud in late-received appointments.

As discussed above, in some embodiments the comparison plan may be designed to reduce or eliminate redundant comparisons for process optimization. For example, in one aspect, the comparison plan may require the new appointments in the first set to be compared with each other (excluding any self-comparisons) to determine whether a new test taker may be an imposter for another new test taker. To that end, the system may compare each new appointment in the first set to every other new appointment in the set, except to itself 520. The comparisons may be uni-directional or bi-directional, as previously described. Again, a voice biometric engine may be invoked to compare voice samples to voice prints and generate corresponding raw comparison scores 523. A composite score 527 may then be computed for each appointment pair based on the associated raw scores.

The comparison plan may also, e.g., require the new appointments to be compared to the existing/prior appointments in case a test taker in one group is taking the test for someone in the other group. In one implementation, the comparison plan may compare 530 each new appointment in the first set 505 to each existing/prior appointment in the second set 510. In one implementation, the comparisons 530 may be uni-directional. As an example, if the first set 505 includes a single new appointment {C} and the second set 510 includes two existing appointments {D, E}, and each appointment's voice samples and voice print are designated by the suffix -vs and -vp, respectively, the following pairs of uni-directional comparisons may be made: (C-vs, D-vp) and (C-vs, E-vp). In some implementations, the comparison plan may also require each existing/prior appointment in the second set 510 to be compared 540 to each new appointment in the first set 505. The comparisons 540 may again be uni-directional. Continuing the above example, the following pairs of comparisons may be made: (D-vs, C-vp) and (E-vs, C-vp). As described above, a voice biometric engine may be invoked to compare voice samples to voice prints and output corresponding raw scores to indicate similarity 543. For each appointment pair compared, a corresponding composite score may be computed using the associated raw scores. Continuing the example above, a composite score 547 for the appointment pair (C, D) may be calculated using the raw scores from the following comparisons: (C-vs, D-vp) and (D-vs, C-vp).

The composite score as well as the raw scores computed in, e.g., FIG. 5's flow chart may then be used to detect fraud, as shown in FIG. 5B. In the example shown, the same process (i.e., FIG. 5B) evaluates the comparisons under label 520 and the comparisons under labels 530 and 540; however, in another example different processes may be used. Given that the expectation under the instant scenario is that, absent fraud, every test taker's voice signature should be different, detection of similar appointments would signify a likelihood of fraud. In one embodiment, the composite score may first be compared to a similarity threshold condition 560 to determine whether detailed evaluation is necessary. For example, the similarity threshold condition may be a lower bound condition for composite scores. If the threshold condition is not satisfied 560 (at No), no further evaluation of the appointment pair would be performed and the associated scores may be deleted 569. If, on the other hand, the threshold condition is satisfied 560 (at Yes), further evaluation of the appointment pair would be performed. Again, as described in detail above, further evaluations of the appointment pair may include applying flag criteria 562 to the pair's raw scores to determine whether the appointment pair should be flagged for further evaluation. If the flag criteria are met 563 (at Yes), then hold criteria 565 may be applied to the raw scores. If the hold criteria are met 566 (at Yes), then in some implementations an entry may be added to a hold file 568 to indicate that any evaluation scores for the appointment pair should be withheld from distribution. During this evaluation process, if the flag criteria 562 or the hold criteria 565 are not satisfied, the evaluation may terminate and the associated raw scores may be deleted 569 to free up resources.

Figure 6A:
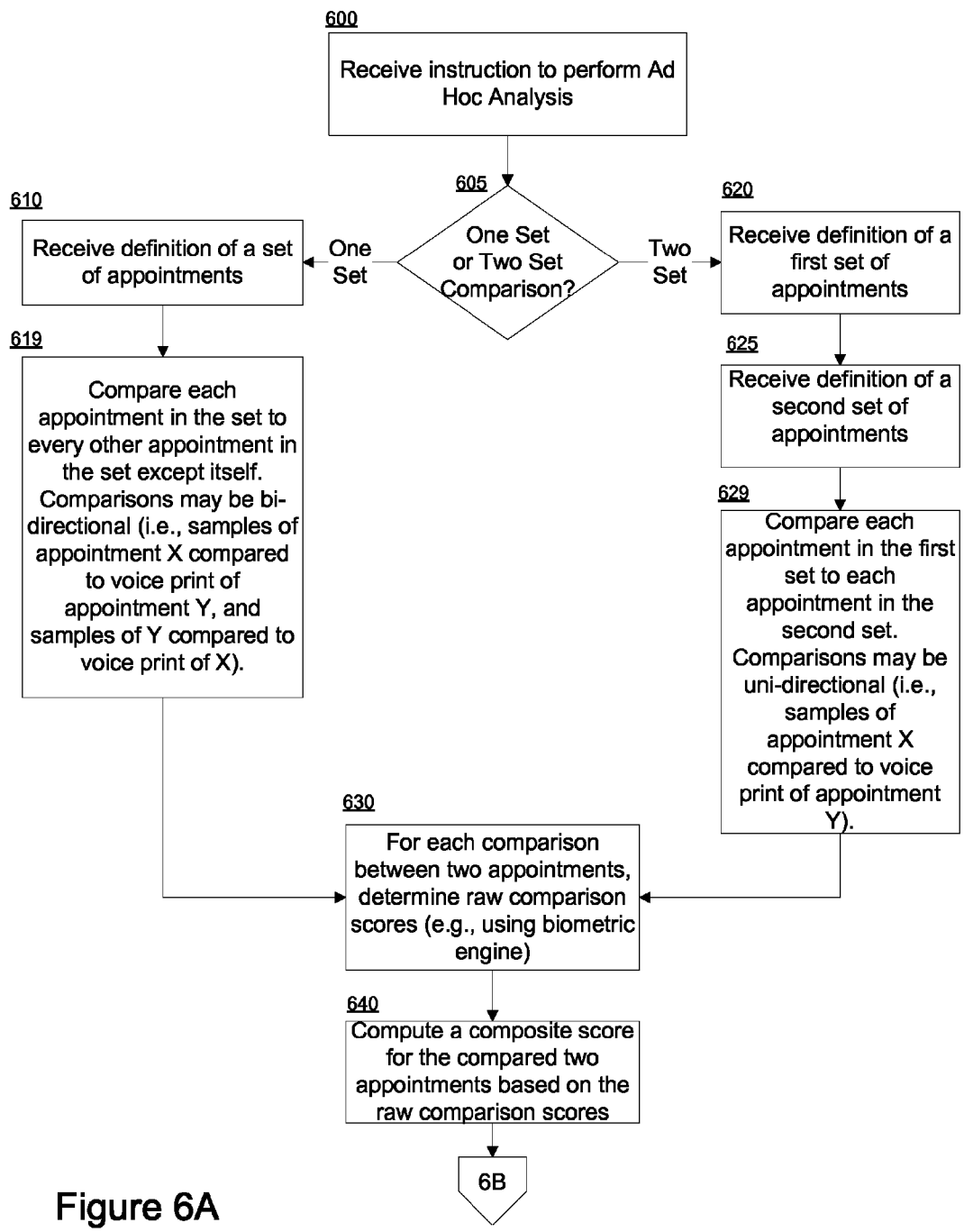
FIGS. 6A-6B are flow diagrams depicting a computer-implemented method of performing ad hoc imposter detection.
Figure 6B:
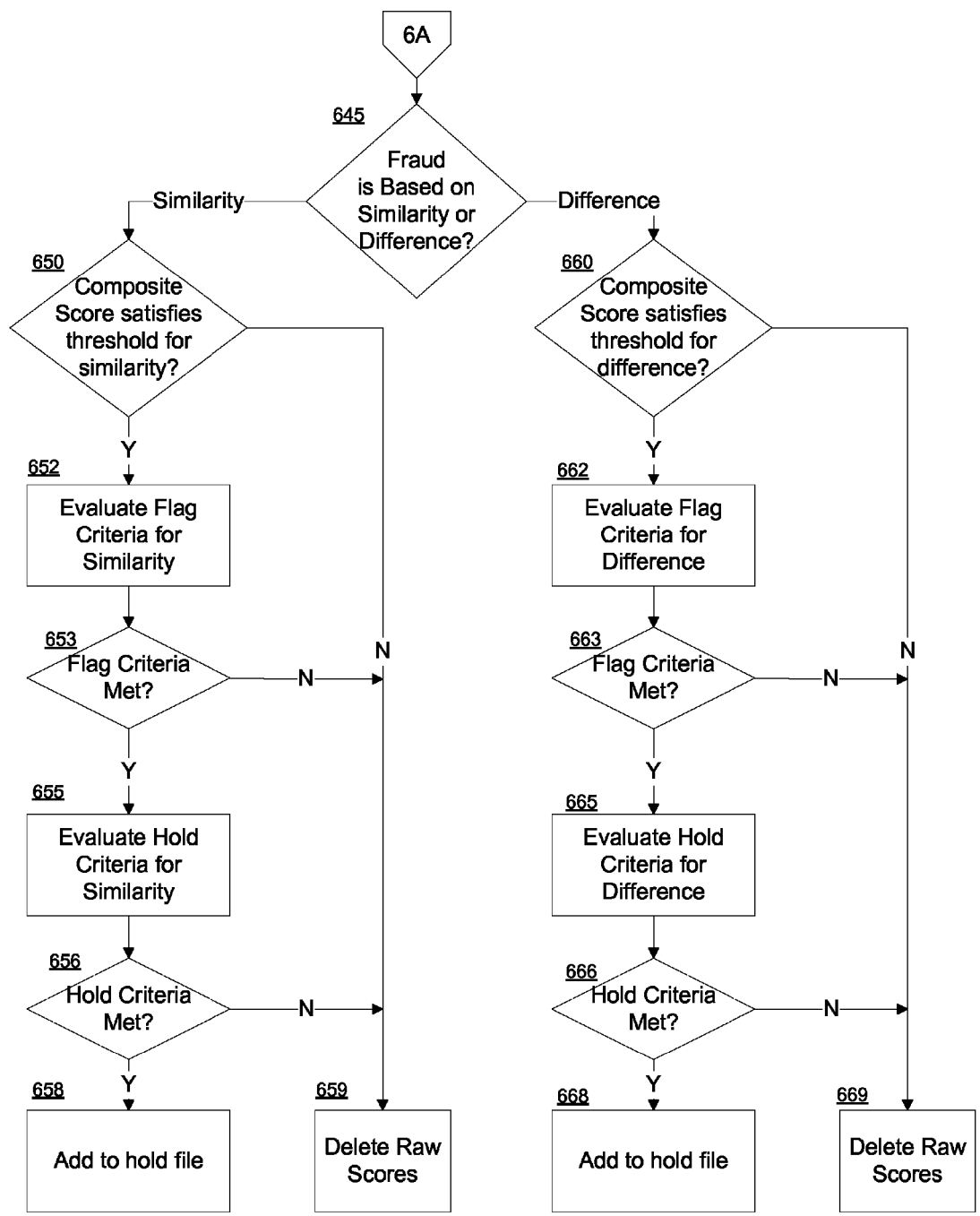

FIG. 6A-6B are flow diagrams depicting a computer-implemented method of performing ad hoc imposter detection. When operating under this mode, the system allows the user to custom tailor the comparison process based on need. In one embodiment, the system may receive an instruction from the user indicating that an ad hoc analysis is desired 600. Based on the user input, the system may determine whether the user wishes to perform a one set or two set comparison 605. If a one set comparison is desired, the system may further receive definitions for the set (e.g., a custom list of test takers), and accordingly define a set of appointments 610. Each appointment in the defined set may be compared to every other appointment in the set 619. In one embodiment, the comparisons may be bi-directional. If, on the other hand, the system receives instructions for performing a two set comparison, the system may receive definitions for a first set of appointments 620 and definitions for a second set of appointments 625. In one embodiment, each appointment in the first set 620 may be compared to each appointment in the second set 625 uni-directionally 629. As described above, a voice biometric engine may be invoked to perform the comparisons and output corresponding raw comparison scores 630. For each pair of appointments compared, the associated raw scores may be used to compute a composite score 640.

Referring now to FIG. 6B, the user may also specify whether similarity or difference between appointments signal fraud 645. For example, for intra-test center analysis, described above, similarity between appointments signal fraud; on the other hand, for repeat test taker analysis, difference between appointments signal fraud. If the user specifies that similarity should signal fraud, the system may perform a series of evaluations accordingly. For example, for each appointment pair compared, the system may first compare the associated composite score to a similarity threshold (e.g., a composite score must exceed a threshold composite score value to signal possibility of fraud) 650. If the similarity threshold is met, the system may evaluate the appointment pair's raw scores against a set of flag criteria for similarity 652. If the flag criteria are met 653 (at Yes), which means that the appointments are sufficiently similar, the system may proceed to evaluate hold criteria for similarity 655. If the hold criteria for similarity are also satisfied 656 (at Yes), then an entry may be placed in a hold file to indicate that the evaluation scores for the appointment pair should be withheld. If during this evaluation process any of the conditions/criteria are not met, then the evaluation process may end and the associated scores may be deleted to free up resources 659. If the user instead indicates that fraud is evidenced by differences between appointments, the system would configure its fraud detection conditions/criteria accordingly to detect scores that signal differences, as shown by labels 660, 662, and 665 in FIG. 6B.

The computerized approaches for detecting imposters described herein are very different from conventional human-based imposter detection. In conventional human-based imposter detection, a human reviewer may typically verify a written identification, e.g., a driver's license or other photo identification, of a subject, and verify that written identification against the human reviewer's identification records for that subject. Conventional human detection of imposters does not involve the use of the voice biometric engines, voice prints, appointment data structures, evaluation sequences, transformation of raw data to composite scores, etc., as described herein. Moreover, the approach described herein cannot be carried out by mere human mental activity because it is infeasible for humans to accurately compare speech samples of arbitrary persons, let alone numerous subjects, such as in the case of standardized tests. Whereas human imposter detection may suffer from an inability to detect fraud where high quality fake records are involved, the data analytics and statistical methodologies described herein do not suffer from such deficiencies.

Figure 7A:
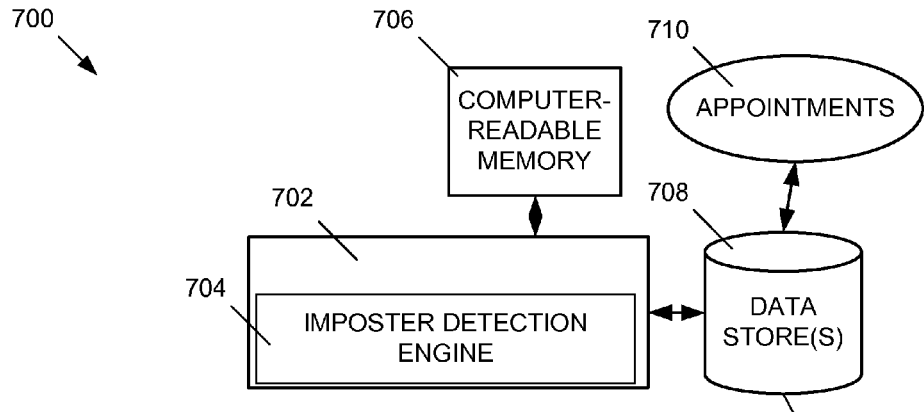
FIGS. 7A, 7B, and 7C depict example systems for use in implementing a system for detecting imposters.
Figure 7B:
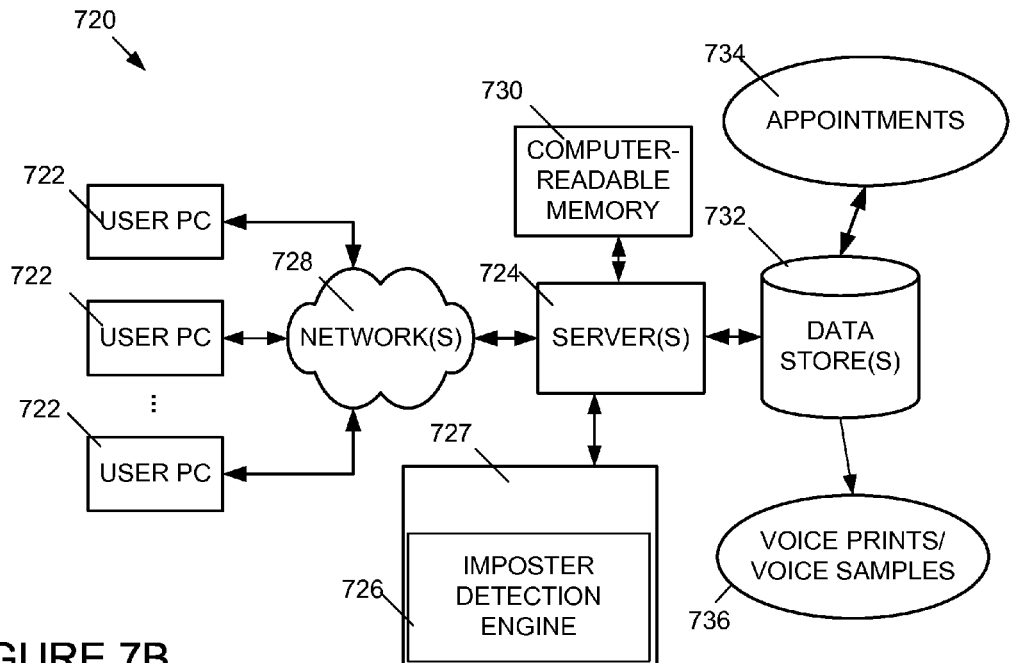
Figure 7C:
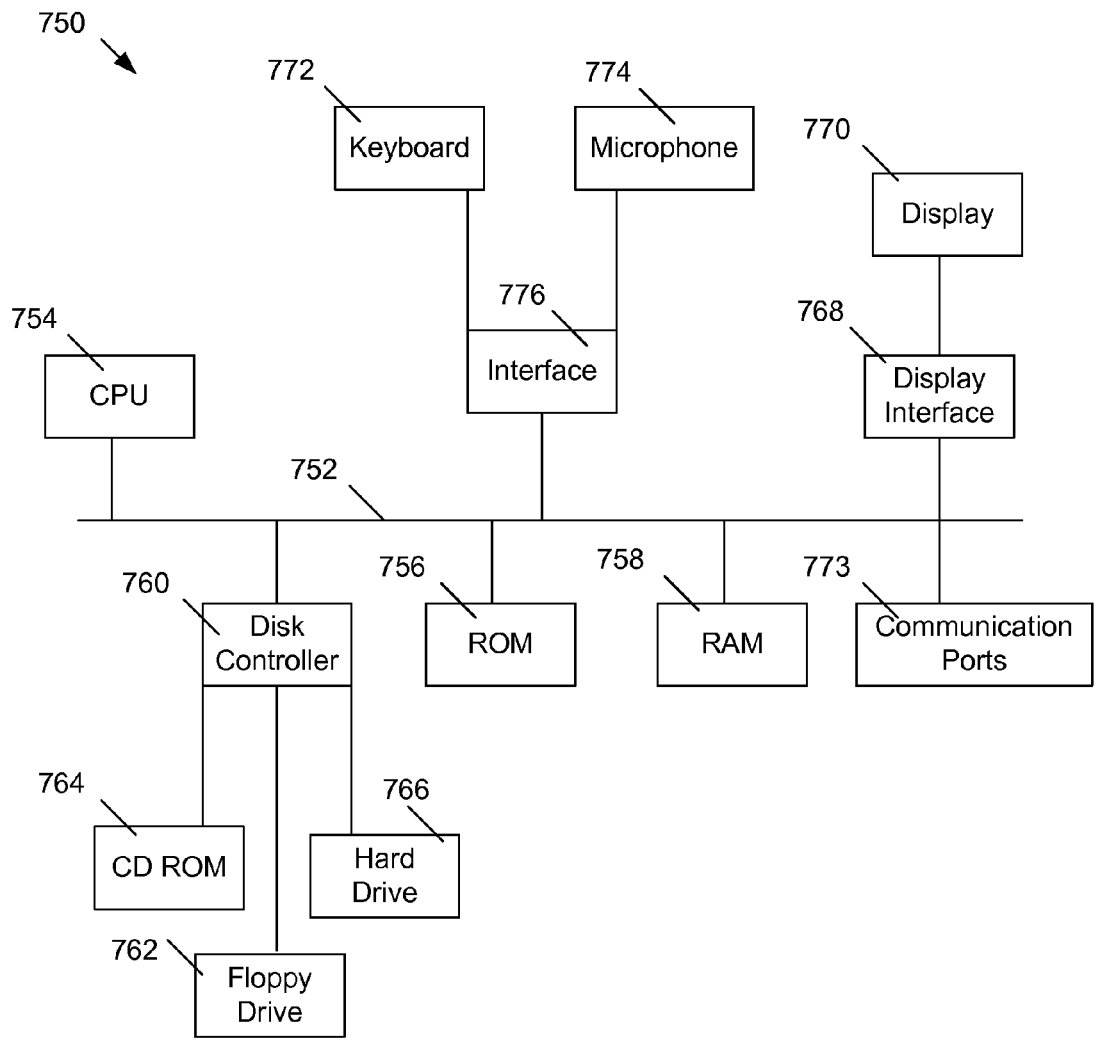

Additional examples will now be described with regard to additional exemplary aspects of implementation of the approaches described herein. FIGS. 7A, 7B, and 7C depict example systems for use in implementing a system for detecting imposters based on voice samples/signatures. For example, FIG. 7A depicts an exemplary system 700 that includes a standalone computer architecture where a processing system 702 (e.g., one or more computer processors located in a given computer or in multiple computers that may be separate and distinct from one another) includes an imposter detection engine 704 being executed on it. The processing system 702 has access to a computer-readable memory 706 in addition to one or more data stores/data sources 708. The one or more data stores 708 may include appointment data 710 as well as associated voice prints and voice samples 712.

FIG. 7B depicts a system 720 that includes a client server architecture. One or more user PCs 722 access one or more servers 724 running a imposter detection engine 726 on a processing system 727 via one or more networks 728. The one or more servers 724 may access a computer readable memory 730 as well as one or more data stores 732. The one or more data stores 732 may contain appointment data 734 as well as associated voice prints and voice samples 736.

FIG. 7C shows a block diagram of exemplary hardware for a standalone computer architecture 750, such as the architecture depicted in FIG. 7A that may be used to contain and/or implement the program instructions of system embodiments of the present invention. A bus 752 may serve as the information highway interconnecting the other illustrated components of the hardware. A processing system 754 labeled CPU (central processing unit) (e.g., one or more computer processors at a given computer or at multiple computers), may perform calculations and logic operations required to execute a program. A non-transitory processor-readable storage medium, such as read only memory (ROM) 756 and random access memory (RAM) 758, may be in communication with the processing system 754 and may contain one or more programming instructions for performing the method of implementing a imposter detection engine. Optionally, program instructions may be stored on a non-transitory computer readable storage medium such as a magnetic disk, optical disk, recordable memory device, flash memory, or other physical storage medium.

A disk controller 760 interfaces one or more optional disk drives to the system bus 752. These disk drives may be external or internal floppy disk drives such as 762, external or internal CD-ROM, CD-R, CD-RW or DVD drives such as 764, or external or internal hard drives 766. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 760, the ROM 756 and/or the RAM 758. Preferably, the processor 754 may access each component as required.

A display interface 768 may permit information from the bus 752 to be displayed on a display 770 in audio, graphic, or alphanumeric format. Communication with external devices may optionally occur using various communication ports 773.

In addition to the standard computer-type components, the hardware may also include data input devices, such as a keyboard 772, or other input device 774, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of detecting imposture in a collection of appointments based on voice samples, comprising:
   receiving, by a processing system, instructional information specifying one or more parameters;
   determining, by the processing system, at least one set of appointments based on the instructional information, each appointment being associated with one or more voice samples and a voice print;
   determining, by the processing system, a comparison plan based on the instructional information, the comparison plan defining a plurality of appointment pairs, each appointment pair including a first appointment selected from the at least one set of appointments and a second appointment selected from the at least one set of appointments, the first appointment and the second appointment being different;
   for each of the plurality of appointment pairs:
      comparing, by the processing system, each of a predetermined number of the voice samples associated with the first appointment of the appointment pair to the voice print associated with the second appointment of the appointment pair;
      generating, by the processing system, a raw comparison score for each of the comparisons;
      computing, by the processing system, a composite score using the raw comparison scores;
      determining, by the processing system, whether the composite score satisfies a predetermined threshold condition indicative of a threshold likelihood of imposture between the appointment pair;
      if the composite score satisfies the threshold condition, determining, by the processing system, whether the raw comparison scores satisfy a first set of criteria, wherein satisfaction of the first set of criteria represents a first likelihood of imposture between the appointment pair; and
      if the raw comparison scores satisfy the first set of criteria, associating, by the processing system, an indicator with the appointment pair, the indicator representing a detection of imposture between the appointment pair;
      wherein the indicator triggers a system response or a human response to the detection of imposture between the appointment pair.

2. The computer-implemented method of claim 1, wherein each appointment's voice print is generated with the appointment's associated one or more voice samples.

3. The computer-implemented method of claim 1, wherein the comparison plan includes a set of rules for selecting appointments from the at least one set of appointments to define the plurality of appointment pairs.

4. The computer-implemented method of claim 1, wherein the at least one set of appointments is a single set of appointments, wherein the first appointment and the second appointment of each appointment pair are selected from the single set of appointments.

5. The computer-implemented method of claim 1, wherein the at least one set of appointments includes a first set of appointments and a second set of appointments, wherein the first appointment of each appointment pair is selected from the first set of appointments and the second appointment of each appointment pair is selected from the second set of appointments.

6. The computer-implemented method of claim 5, wherein the second set of appointments include appointments associated with known impostors.

7. The computer-implemented method of claim 1, wherein for each appointment pair, the first appointment is associated with a first individual and the second appointment is associated with a second individual.

8. The computer-implemented method of claim 7, wherein the first individual and the second individual are the same.

9. The computer-implemented method of claim 1, wherein the voice samples and the voice prints are compared using a voice biometric engine, and wherein the raw comparison score is generated by the voice biometric engine.

10. The computer-implemented method of claim 1, wherein the computing of the composite score includes identifying a weight associated with a range within which one of the raw comparison scores falls.

11. The computer-implemented method of claim 1, wherein the threshold condition is satisfied if the composite score indicates sufficient similarity between the associated appointment pair, and wherein the first set of criteria is satisfied if the raw comparison scores indicate sufficient similarity between the associated appointment pair.

12. The computer-implemented method of claim 1, wherein the threshold condition is satisfied if the composite score indicates sufficient dissimilarity between the associated appointment pair, and wherein the first set of criteria is satisfied if the raw comparison scores indicate sufficient dissimilarity between the associated appointment pair.

13. The computer-implemented method of claim 1, further comprising:
   if the raw comparison scores satisfy the first set of criteria, determining, by the processing system, whether the raw comparison scores satisfy a second set of criteria, wherein satisfaction of the second set of criteria represents a second likelihood of imposture between the appointment pair; and if the raw comparison scores satisfy the second set of criteria, associating, by the processing system, a second indicator with the appointment pair, the second indicator representing a detection of imposture between the appointment pair;

wherein the second likelihood of imposture is more likely than the first likelihood of imposture.

14. The computer-implemented method of claim 1, wherein the system response triggered by the first indicator causes an evaluation of the associated appointment pair to be withheld from distribution.

15. The computer-implemented method of claim 1, further comprising:

for each of the plurality of appointment pairs:
comparing, by the processing system, each of a predetermined number of the voice samples associated with the second appointment of the appointment pair to the voice print associated with the first appointment of the appointment pair.

16. A system for detecting imposture in a collection of appointments based on voice samples, comprising:
a processing system; and
a memory;
wherein the processing system is configured to execute steps comprising:
receiving instructional information specifying one or more parameters;
determining at least one set of appointments based on the instructional information, each appointment being associated with one or more voice samples and a voice print;
determining a comparison plan based on the instructional information, the comparison plan defining a plurality of appointment pairs, each appointment pair including a first appointment selected from the at least one set of appointments and a second appointment selected from the at least one set of appointments, the first appointment and the second appointment being different;
for each of the plurality of appointment pairs:
comparing each of a predetermined number of the voice samples associated with the first appointment of the appointment pair to the voice print associated with the second appointment of the appointment pair;
generating a raw comparison score for each of the comparisons;
computing a composite score using the raw comparison scores;
determining whether the composite score satisfies a predetermined threshold condition indicative of a threshold likelihood of imposture between the appointment pair;
if the composite score satisfies the threshold condition, determining whether the raw comparison scores satisfy a first set of criteria, wherein satisfaction of the first set of criteria represents a first likelihood of imposture between the appointment pair; and
if the raw comparison scores satisfy the first set of criteria, associating an indicator with the appointment pair, the indicator representing a detection of imposture between the appointment pair;

wherein the indicator triggers a system response or a human response to the detection of imposture between the appointment pair.

17. The system of claim 16, wherein the computing of the composite score includes identifying a weight associated with a range within which one of the raw comparison scores falls.

18. The system of claim 16, wherein the processing system is configured to execute steps comprising:
if the raw comparison scores satisfy the first set of criteria, determining whether the raw comparison scores satisfy a second set of criteria, wherein satisfaction of the second set of criteria represents a second likelihood of imposture between the appointment pair; and
if the raw comparison scores satisfy the second set of criteria, associating a second indicator with the appointment pair, the second indicator representing a detection of imposture between the appointment pair;
wherein the second likelihood of imposture is more likely than the first likelihood of imposture.

19. The system of claim 16, wherein the processing system is configured to execute steps comprising:
for each of the plurality of appointment pairs:
comparing each of a predetermined number of the voice samples associated with the second appointment of the appointment pair to the voice print associated with the first appointment of the appointment pair.

20. A non-transitory computer-readable medium for detecting imposture in a collection of appointments based on voice samples, comprising instructions which when executed cause a processing system to carry out steps comprising:
receiving instructional information specifying one or more parameters;
determining at least one set of appointments based on the instructional information, each appointment being associated with one or more voice samples and a voice print;
determining a comparison plan based on the instructional information, the comparison plan defining a plurality of appointment pairs, each appointment pair including a first appointment selected from the at least one set of appointments and a second appointment selected from the at least one set of appointments, the first appointment and the second appointment being different;
for each of the plurality of appointment pairs:
comparing each of a predetermined number of the voice samples associated with the first appointment of the appointment pair to the voice print associated with the second appointment of the appointment pair;
generating a raw comparison score for each of the comparisons;
computing a composite score using the raw comparison scores;
determining whether the composite score satisfies a predetermined threshold condition indicative of a threshold likelihood of imposture between the appointment pair;
if the composite score satisfies the threshold condition, determining whether the raw comparison scores satisfy a first set of criteria, wherein satisfaction of the first set of criteria represents a first likelihood of imposture between the appointment pair; and
if the raw comparison scores satisfy the first set of criteria, associating an indicator with the appointment pair, the indicator representing a detection of imposture between the appointment pair;

wherein the indicator triggers a system response or a human response to the detection of imposture between the appointment pair.

21. The non-transitory computer-readable medium of claim 20, wherein the computing of the composite score includes identifying a weight associated with a range within which one of the raw comparison scores falls.

22. The non-transitory computer-readable medium of claim 20, comprising instructions for causing the processing system to execute steps, including:

if the raw comparison scores satisfy the first set of criteria, determining whether the raw comparison scores satisfy a second set of criteria, wherein satisfaction of the second set of criteria represents a second likelihood of imposture between the appointment pair; and if the raw comparison scores satisfy the second set of criteria, associating a second indicator with the appointment pair, the second indicator representing a detection of imposture between the appointment pair;

wherein the second likelihood of imposture is more likely than the first likelihood of imposture.

23. The non-transitory computer-readable medium of claim 20, comprising instructions for causing the processing system to execute steps, including:

for each of the plurality of appointment pairs:

comparing each of a predetermined number of the voice samples associated with the second appointment of the appointment pair to the voice print associated with the first appointment of the appointment pair.

* * * * *